United States Patent
Namiki

(10) Patent No.: US 11,559,888 B2
(45) Date of Patent: Jan. 24, 2023

(54) ANNOTATION DEVICE

(71) Applicant: FANUC CORPORATION, Yamanashi (JP)

(72) Inventor: Yuta Namiki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 214 days.

(21) Appl. No.: 17/002,421

(22) Filed: Aug. 25, 2020

(65) Prior Publication Data

US 2021/0129318 A1    May 6, 2021

(30) Foreign Application Priority Data

Oct. 30, 2019  (JP) ............................ JP2019-197597

(51) Int. Cl.
*B25J 9/16*       (2006.01)
*G06V 10/20*    (2022.01)
*G06V 20/20*    (2022.01)

(52) U.S. Cl.
CPC ............ *B25J 9/163* (2013.01); *B25J 9/1697* (2013.01); *G06V 10/255* (2022.01); *G06V 20/20* (2022.01)

(58) Field of Classification Search
CPC ......... B25J 9/163; B25J 9/1697; G06V 20/20; G06V 10/255
See application file for complete search history.

(56) References Cited

U.S. PATENT DOCUMENTS

| 2016/0282126 A1* | 9/2016 | Watts .............. H03K 19/17768 |
| 2017/0139407 A1* | 5/2017 | Sakaguchi ............ B25J 9/1697 |
| 2020/0023521 A1* | 1/2020 | Dan ...................... B25J 9/1692 |
| 2020/0364554 A1* | 11/2020 | Wang ....................... G06T 7/20 |

FOREIGN PATENT DOCUMENTS

| JP | 2018-161692 A | 10/2018 |
| JP | 2018-200531 A | 12/2018 |
| JP | 2019-056966 A | 4/2019 |

OTHER PUBLICATIONS

B. Tekin, S. N. Sinha and P. Fua, "Real-Time Seamless Single Shot 6D Object Pose Prediction," 2018 IEEE/CVF Conference on Computer Vision and Pattern Recognition, Salt Lake City, UT, 2018, pp. 292-301, doi: 10.1109/CVPR.2018.00038.

* cited by examiner

Primary Examiner — Jeff A Burke
Assistant Examiner — Hushmeen J Khan
(74) Attorney, Agent, or Firm — Studebaker & Brackett PC

(57) ABSTRACT

An annotation device includes an image-capturing device, a robot, a control unit, a designation unit, a coordinate processing unit, and a storage unit. The control unit controls the robot so as to acquire a learning image of a plurality of objects, each having a different positional relationship with the image-capturing devices. Furthermore, the storage unit converts a position of the object in a robot coordinate system into a position of the object in an image coordinate system at the time of image-capturing or a position of the object in a sensor coordinate system, and stores the position thus converted together with the learning image.

3 Claims, 5 Drawing Sheets

ANNOTATION DEVICE

This application is based on and claims the benefit of priority from Japanese Patent Application No. 2019-197597, filed on 30 Oct. 2019, the content of which is incorporated herein by reference.

BACKGROUND OF THE INVENTION

Field of the Invention

The present invention relates to an annotation device.

Related Art

Conventionally, in a method for detecting an object from an image, a technique for enhancing detection accuracy by performing learning has been known. Technologies related to this type of learning are disclosed in Japanese Unexamined Patent Application, Publication Nos. 2018-200531, 2019-056966, and 2018-161692, and the non-patent document titled "Real-Time Seamless Single Shot 6D Object Pose Prediction".

Japanese Unexamined Patent Application, Publication No. 2018-200531 relates to a training data generating device for generating training data used when object detection of a specific identification target is performed. Japanese Unexamined Patent Application, Publication No. 2018-200531 describes performing learning by an object recognition method using reference data including a specific identification target to create an identification model of the specific identification target. The identification model is used for performing inference from moving image data including a specific identification target by an object recognition method, detecting a specific identification target, and generating training data of the specific identification target.

Japanese Unexamined Patent Application, Publication No. 2019-056966 relates to an information processing device including an image-capturing device capable of capturing a first distance image of an object at a plurality of angles, and a generating unit that generates a three-dimensional model of the object based on the first distance image and, based on the three-dimensional model, generates an extracted image showing a specific portion of the object corresponding to the plurality of angles. Japanese Unexamined Patent Application, Publication No. 2019-056966 describes setting the location at which a robot hand grips an object as a specific site of the object, and allowing an image recognition unit to provide the location information of the specific site of the object where the image recognition site has been estimated as control information to the robot hand.

Japanese Unexamined Patent Application, Publication No. 2018-161692 describes an information processing device that generates learning data for holding a target object using a holding position and posture of a manipulator when holding the target object, information on whether holding of the target object in the holding position and posture is successful, and an image-capturing position and posture of the manipulator when capturing the image.

The non-patent document titled "Real-Time Seamless Single Shot 6D Object Pose Prediction" describes a technique of estimating a three-dimensional position of an object from an image in a convolutional neural network, which is one depth-learning technique.

Patent Document 1: Japanese Unexamined Patent Application, Publication No. 2018-200531

Patent Document 2: Japanese Unexamined Patent Application, Publication No. 2019-056966

Patent Document 3: Japanese Unexamined Patent Application, Publication No. 2018-161692

Non-Patent Document

Non-Patent Document 1: Real-Time Seamless Single Shot 6D Object Pose Prediction

SUMMARY OF THE INVENTION

In the prior art, an object is detected from an image by paying attention to an outline of the object or the like as one of the features. Due to the brightness at the time of capturing the image, the feature to which attention is paid cannot be distinguished, and hence, sometimes the object could not be detected from the image. Furthermore, when the positional relationship between the camera and the target when capturing an image including the object is changed, how the object is seen greatly changes, and hence, the object sometimes cannot be detected from the image.

When machine learning such as deep learning is used, features can be learned for each object and detection of the object can be performed more robustly. One of the methods of deep learning is supervised learning. However, supervised learning requires annotation of the position and posture of an object in an image with respect to a large number of images, which is one of the hurdles in performing deep learning. In addition, if a user performs annotation processing, the accuracy of the annotation may be reduced due to variations in the user's references.

It is desirable to provide an annotation device that can easily and accurately perform annotation processing for a large number of images.

An aspect of an annotation device according to the present disclosure relates to an annotation device including: an image-capturing device that image-captures one or more object and acquires an image; a robot that moves the image-capturing device or the object so that the object enters an image-capturing range of the image-capturing device; a control unit that controls movement of the robot; a designation unit that designates a position of the object in an image coordinate system of the image captured by the image-capturing device, a position of the object in a sensor coordinate system with a position of the image-capturing device as a reference, or a position of the object in a robot coordinate system with the robot as a reference; a coordinate processing unit configured to convert the position of the object in the image coordinate system or the position of the object in the sensor coordinate system into the position of the object in the robot coordinate system, and configured to convert the position of the object in the robot coordinate system into the position of the object in the image coordinate system or the position of the object in the sensor coordinate system; and a storage unit that stores a position of the object in the robot coordinate system acquired based on a designation of the designation unit, in which the control unit controls the robot so as to acquire a learning image of a plurality of the objects, each having a different positional relationship between the image-capturing device and the object, and in which the storage unit converts the position of the object in the robot coordinate system into the position of the object in the image coordinate system at the time of image-capturing or the position of the object in the sensor coordinate system, and stores position thus converted together with the learning image.

According to one aspect of the present disclosure, it is possible to provide an annotation device that can easily and accurately perform annotation processing for a large number of images.

DETAILED DESCRIPTION OF THE INVENTION

Figure 1:
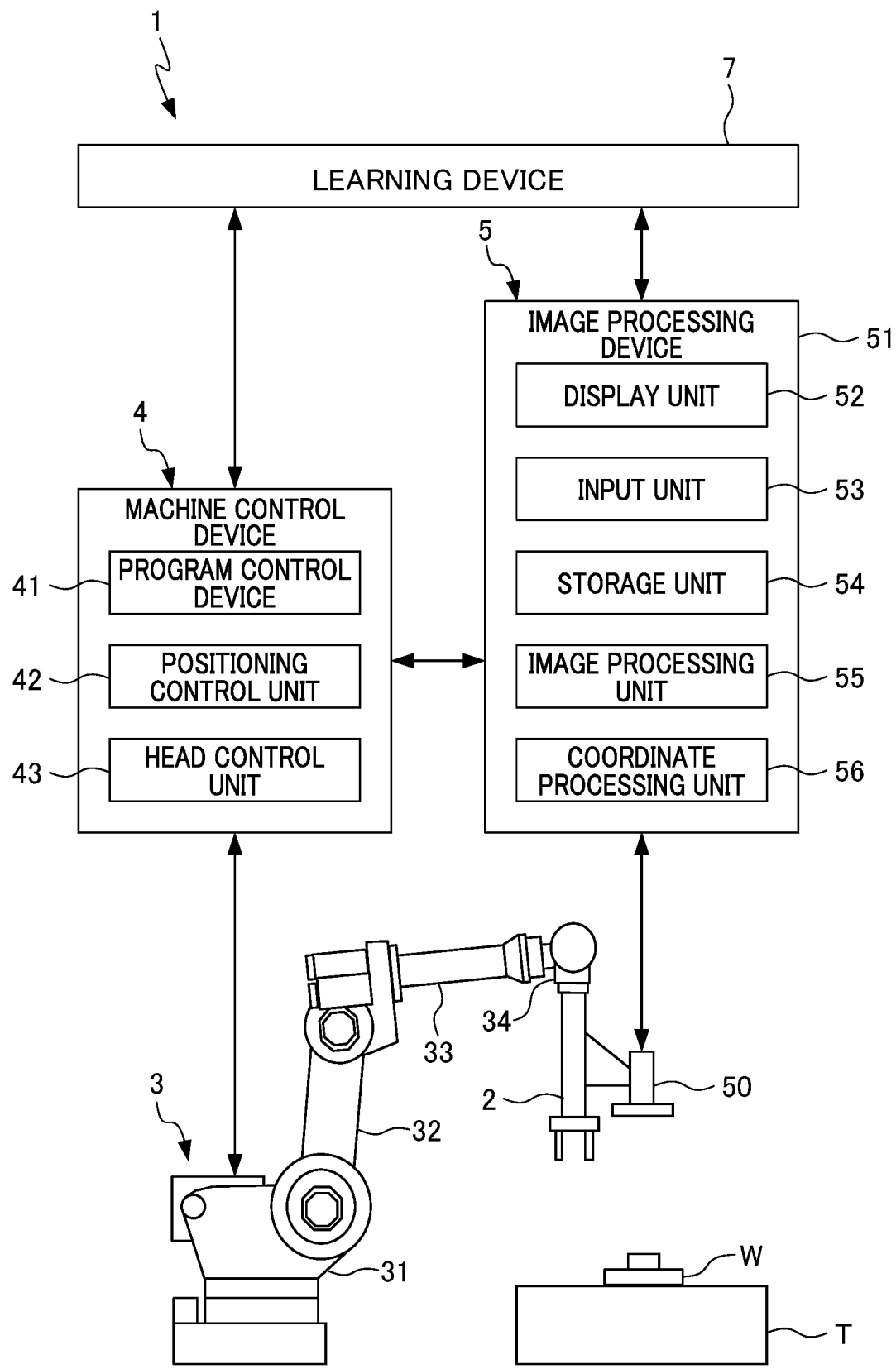
FIG. 1 is a schematic diagram showing the configuration of an industrial machine as an annotation device according to an embodiment of the present disclosure.

Embodiments of the present disclosure will be described below with reference to the drawings. FIG. 1 is a schematic diagram showing a configuration of an industrial machine 1 as an annotation device according to an embodiment of the present disclosure.

The industrial machine 1 of the present embodiment includes a robot 3 that performs predetermined machining on a workpiece W placed on a table T, a machine control device 4 that controls the robot 3, an image processing system 5 that acquires an image including the workpiece W and specifies the position and the orientation of the workpiece W, and a learning device 7 that performs learning processing.

The robot 3 is a vertical articulated robot, and includes a plurality of movable members 31, 32, 33, and 34 rotatably connected to each other and having a machining head 2 connected to the tip thereof. The machining head 2 is positioned by the plurality of movable members 31, 32, 33, and 34. It should be noted that the type of the robot 3 is not particularly limited. The robot 3 may be a vertical articulated robot, a Cartesian coordinate type robot, a scalar type robot, a parallel link type robot, or the like.

Examples of the machining head 2 include a hand which can be gripped to move the workpiece W and a machining head that can perform welding, laser machining, cutting, etc. on the workpiece W. The machining head 2 has an appropriate configuration in accordance with the machining to be performed on the workpiece W. In the industrial machine 1 shown in the drawings, the machining head 2 is a hand as a gripping portion for gripping a workpiece. The machining head 2 can grip the workpiece W and move it to a predetermined position, or can change the posture of the workpiece W.

The machine control device 4 is a control unit that determines the operations of the robot 3 and the image processing system 5 in accordance with a work program such as a machining program given in advance, for example. The machine control device 4 can be configured by performing appropriate programming in, for example, a programmable controller, a numerical controller or the like. The machine control device 4 includes a CPU (not shown) for overall control, and is also connected to the robot 3 and an image processing device 51 via an external device interface (not shown).

The machine control device 4 of the present embodiment includes a program control unit 41, a positioning control unit 42 for controlling the robot 3, and a head control unit 43 for controlling the machining head 2. The program control unit 41, the positioning control unit 42, and the head control unit 43 in the machine control device 4 are distinguished by their functions, and thus, they may not be clearly distinguishable in physical configuration and program configuration.

The program control unit 41 gives an operation command to the robot 3 and the image processing system 5 in accordance with a work program such as a machining program. More specifically, the program control unit 41 gives a command to the robot 3 to cause the machining head 2 to grip or release the workpiece W and to specify a position at which the machining head 2 is moved. Furthermore, the program control unit 41 gives a command to confirm the position of the workpiece W to the image processing system 5.

Furthermore, the program control unit 41 is configured to input a parameter capable of specifying the position and posture of the machining head 2 such as the driving amount or the like representing the relative relationship of the movable members 31, 32, 33, and 34 obtained from the positioning control unit, to the image processing system 5 as machine control information.

The machine control information also includes the coordinate position of the tip of the robot 3 in the robot coordinate system. If necessary, information indicating the state of the machining head 2 controlled by the head control unit 43 and information indicating whether or not the machining of the workpiece W by the machining head 2 has been properly executed may also be inputted to the image processing system 5 as a part of the machine control information.

The positioning control unit 42 generates a drive signal for relatively rotating the movable members 31, 32, 33, and 34 of the robot 3 in accordance with a command from the program control unit 41. Furthermore, the positioning control unit 42 outputs a parameter which is the machine control information. As a specific example, a parameter outputted by the positioning control unit can be rotational positional information of a plurality of drive motors for driving the movable members 31, 32, 33, and 34, vector information showing the coordinate position and orientation of the reference point of the machining head 2, or the like.

The head control unit 43 controls the operation of the machining head 2 and performs machining on the workpiece W. Furthermore, a signal representing the state of the machining head 2 may be configured to be inputted to the program control unit 41.

The image processing system 5 includes a vision sensor 50 for capturing an image of the workpiece W, and an image processing device 51 for controlling the vision sensor 50 and performing the processing of the image data captured by the vision sensor 50.

The vision sensor 50 may be configured by a camera having an optical system for imaging an image of light from the subject and a two-dimensional image-capturing device for converting the imaged image into an electrical signal for each two-dimensional position.

The vision sensor 50 is attached to the robot 3. The vision sensor 50 of the present embodiment is supported by the machining head 2 or the movable member 34 at the end to which the machining head 2 is connected.

The robot 3 is driven to a position where the workpiece W as an object enters the field of view of the vision sensor 50, and an image is captured by the vision sensor 50, and then, the machining operation by the machining head 2 can be performed on the workpiece W detected from the image captured by the image processing to be described later.

The image processing device 51 performs various types of processing on the image detected by the vision sensor 50. The image processing device 51 of the present embodiment includes a display unit 52, an input unit 53, a storage unit 54, an image processing unit 55, and a coordinate processing unit 56.

The display unit 52 may include a display panel or the like for displaying information to an operator. Furthermore, the display unit 52 may be a touch panel or the like formed integrally with the input unit 53.

The input unit 53 may include an input device such as a keyboard, switches, or the like that can be manipulated by an operator. Furthermore, the input unit 53 may accept an input from another control device or a computer via a communication line or the like.

The storage unit 54 is not particularly limited, but can be configured by volatile memory such as DRAM and SRAM. The storage unit 54 stores various types of information relating to control of the vision sensor 50 and image processing. For example, the storage unit 54 stores the image data captured and acquired by the vision sensor 50, the processing result of the image data, and the machine control information at the time of image-capturing, etc. as image-capturing information.

Furthermore, the storage unit 54 stores a model pattern obtained by modeling the image of the workpiece W, for example, a model pattern representing the features of the image of the workpiece W.

Furthermore, the storage unit 54 stores calibration data of the vision sensor 50, for example, calibration data for transforming a two-dimensional position on an image coordinate system into a value in three-dimensional coordinates or vice versa. For example, by calibrating the vision sensor 50 based on the calibration data stored in the storage unit 54, when a three-dimensional point in the robot coordinate system (hereinafter, a gaze point) is given, the position of the image on the image of the vision sensor 50 of the three-dimensional point, i.e. a two-dimensional point in the coordinate system can be calculated. Furthermore, when a two-dimensional point in the sensor coordinate system is given which is an image of a certain gaze point, it becomes possible to calculate the line of sight in the robot coordinate system (three-dimensional straight line through the gaze point and the focal point of the camera). Various methods have been proposed for the format of the calibration data and the method for obtaining the calibration data, and any method may be used. It should be noted that the image coordinate system refers to a coordinate system defined on an image (two-dimensional), and the sensor coordinate system refers to a coordinate system viewed from the vision sensor 50 (three-dimensional). The robot coordinate system refers to a coordinate system (three-dimensional) viewed from the robot 3.

The image processing unit 55 analyzes the image data captured by the vision sensor 50 by a known image processing technique, and determines the position and orientation of the workpiece W. The image processing unit 55 can be realized by executing an appropriate program in an arithmetic unit such as a CPU.

Figure 2:
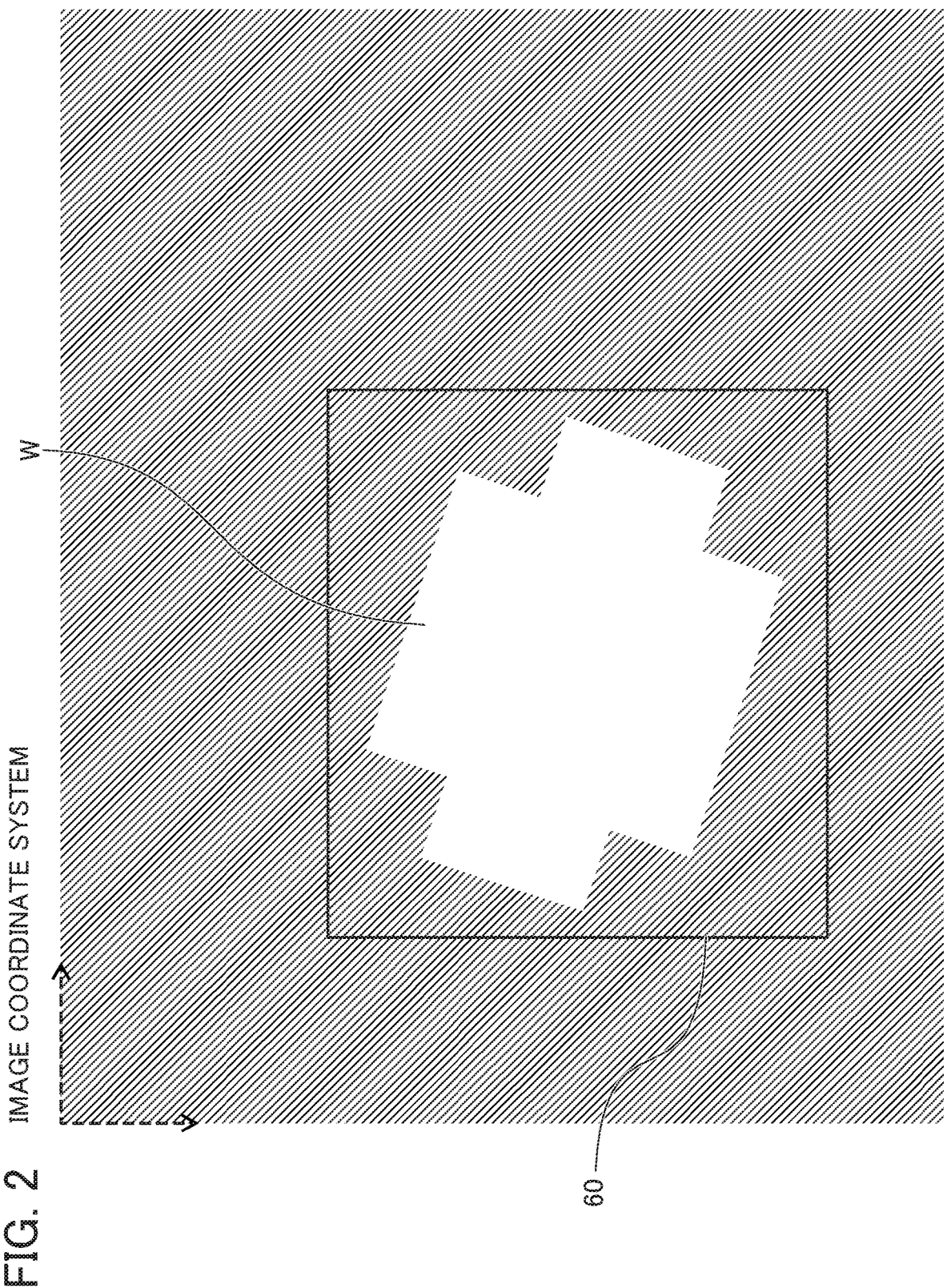
FIG. 2 is a diagram schematically showing a state in which a model pattern designation area is designated in an image acquired by an industrial machine according to an embodiment of the present disclosure.

The processing of detecting the workpiece W from the image acquired by the vision sensor 50 will be described with reference to FIG. 2. FIG. 2 is a diagram schematically showing a state in which a model pattern designation area 60 is designated in an image acquired by the industrial machine 1 according to the embodiment of the present disclosure.

The model pattern designation area 60 is set by an operator operating the input unit 53 while checking the image of the display unit 52. It should be noted that the model pattern designation area 60 may be automatically designated by the image processing unit 55 performing predetermined image processing instead of the operator. For example, the model pattern designation area 60 may be set so as to include the contour of the image of the workpiece W inside by calculating a position having a large brightness gradient in the image as the contour of the image of the workpiece W.

The coordinate processing unit 56 converts the detection position of the workpiece W of the image coordinate system (two-dimensional) or the detection position of the workpiece W of the sensor coordinate system (three-dimensional) to obtain a three-dimensional line of sight. Thereafter, the coordinate processing unit 56 performs three-dimensional conversion processing for converting the detection position of the workpiece W of the image coordinate system (two-dimensional) or the detection position of the workpiece W of the sensor coordinate system (three-dimensional) into the detection position of the workpiece W on the robot coordinate system (three-dimensional) based on the model pattern designation area and the calibration data stored in the storage unit 54, and the position of the vision sensor 50 of the robot 3 at the time of image-capturing. In this three-dimensional conversion processing, information for determining a variable position in the line-of-sight direction is required when a two-dimensional camera is used for the vision sensor 50. In the present embodiment, three-dimensional conversion processing is executed after setting a plane in which four points are present, the positions of which are designated on the image of the workpiece W.

Figure 3:
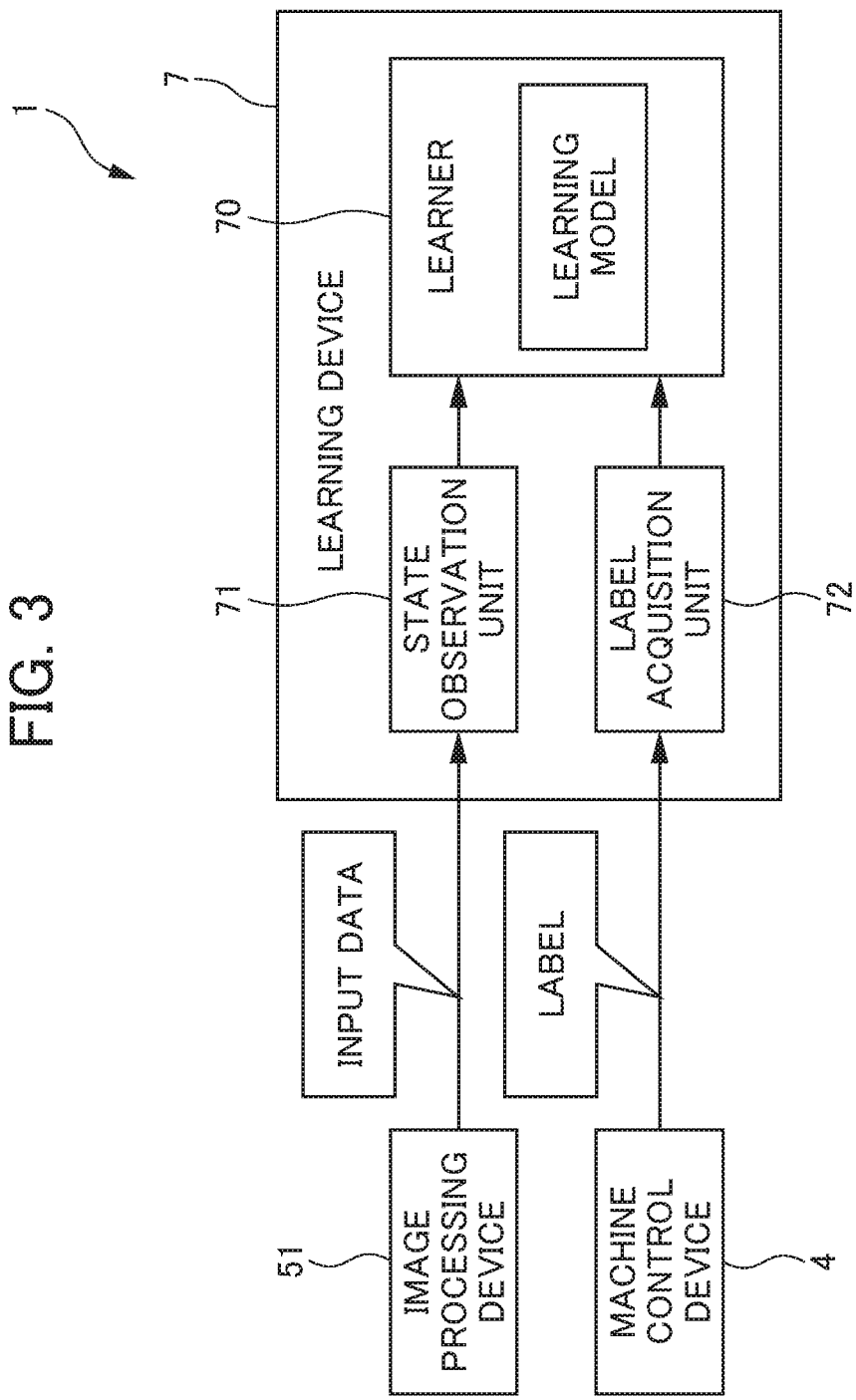
FIG. 3 is a functional block diagram of a learning device included in an industrial machine according to an embodiment of the present disclosure.

Next, the configuration of the learning device 7 will be described with reference to FIG. 3. FIG. 3 is a functional block diagram of the learning device 7 included in the industrial machine 1 according to an embodiment of the present disclosure.

As shown in FIG. 3, the learning device 7 includes a state observation unit 71 to which input data is inputted from the image processing device 51, a label acquisition unit 72 to which a label corresponding to an image is inputted from the machine control device 4, and a learner 70 that performs supervised learning based on the input data acquired by the state observation unit 71 and a label inputted from the machine control device 4 to generate a learning model.

The input data inputted from the image processing device 51 to the state observation unit 71 is an image including the workpiece W as an object or a processing result of the image, or both.

The label inputted from the machine control device 4 to the label acquisition unit 72 is positional information indicating the position of the workpiece W as an object when an image is captured. The positional information is information at the time of image-capturing including a detection position, a posture, a size, and the like of the workpiece W corresponding to a certain image. For example, in a case where the position of the workpiece W is designated by a closed region of four corners, information indicating the position of four points is stored as information indicating the position of the workpiece W.

In the present embodiment, the label inputted to the label acquisition unit 72 is acquired by converting the position of the workpiece W in the robot coordinate system into a position in the image coordinate system or a position in the sensor coordinate system. It should be noted that the processing of acquiring the positional information indicating the position in the image coordinate system or the position in the sensor coordinate system of the workpiece W serving as the label will be described later.

The input data acquired by the state observation unit 71 and the label acquired by the label acquisition unit 72 are inputted to the learner 70 in association with each other. In the learner 70, a learning model is generated based on a plurality of sets of input data and labels.

Figure 4:
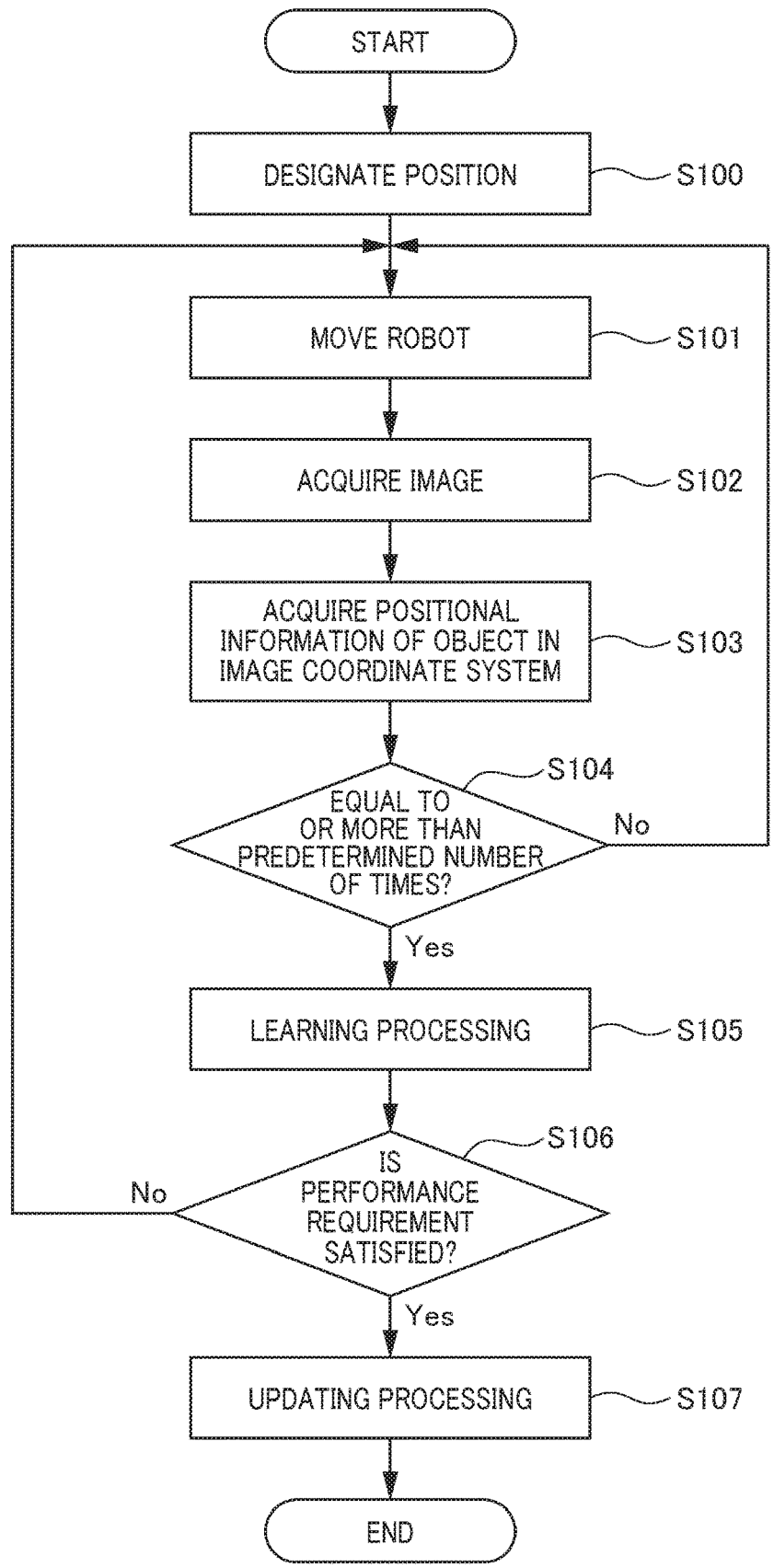
FIG. 4 is a flowchart showing the flow of annotation processing by an industrial machine according to an embodiment of the present disclosure.

Next, a flow of annotation processing will be described. FIG. 4 is a flowchart showing the flow of annotation processing by the industrial machine 1 according to one embodiment of the present disclosure. It should be noted that the embodiment described showing this flow is an example.

When the annotation processing is started, processing for making the position of the workpiece W known is executed in step S100. For example, the machine control device 4 drives the robot 3 so that the workpiece W is positioned within the image-capturing range of the vision sensor 50. Then, in a state in which the workpiece W has entered the image-capturing range of the vision sensor 50, an image including the workpiece W by image-capturing the workpiece W by the vision sensor 50 is acquired. For example, an image such as shown in FIG. 2 is acquired.

Next, processing for designating the position of the workpiece W is performed. For the designation of the position of the workpiece W, for example, a method of designating one point of the position of the workpiece W in the image or a method of surrounding the periphery of the workpiece W with a closed region such as a square can be used. The designation of the position of the workpiece W may be performed by the image processing unit 55 using an image processing algorithm as a designation unit, or may be performed by the user using the input unit 53 as a designation unit. Thus, the position of the workpiece W in the image coordinate system or the position of the workpiece W in the sensor coordinate system is determined.

As described above, since the calibration processing that enables the conversion from the image coordinate system to the robot coordinate system is performed in advance, the position of the workpiece W in the designated image coordinate system or the position of the workpiece W in the sensor coordinate system is converted into the robot coordinate system. The position of the workpiece W in the robot coordinate system is thereby acquired. That is, the position of the workpiece W is known. It should be noted that, as processing of making the position of the workpiece W known, a method of directly designating the installation position of the workpiece W to the robot coordinate system may be used.

Through the above processing, the position of the workpiece W in the robot coordinate system can be made known. Then, the processing advances from Step S100 to Step S101 for acquiring a data set to be used for learning.

In Step S101, the positional relation between the vision sensor 50 and the workpiece W is changed by the robot 3 on a condition that the workpiece W is included in the image-capturing range. Since the position of the workpiece W in the robot coordinate system has been acquired in Step S100, it is also possible to calculate the position of the robot 3 at which the workpiece W is included in the image in the control for moving the robot 3.

In Step S101, in the processing of changing the positional relationship between the vision sensor 50 and the workpiece W by the robot 3, movement of the workpiece W made using the machining head 2 may be performed. The movement of the workpiece W includes, for example, processing of moving the workpiece W to the left, right, front, and back, changing the posture of the workpiece W, or turning the workpiece W upside down. It should be noted that, when the workpiece W is moved, processing of updating the position of the workpiece W in accordance with the position at which the workpiece W has been moved is also performed. That is, the position of the workpiece W in the robot coordinate system is updated with the movement of the workpiece W.

In Step S102, an image of the workpiece W is captured while the positional relationship between the vision sensor 50 and the workpiece W is changed by the robot 3 in Step S101, and an image including the workpiece W is acquired.

In Step S103, the position of the workpiece W in the image coordinate system corresponding to the image acquired in Step S102 is acquired. The position of the workpiece W in the image coordinate system acquired in Step S103 is acquired by using the position of the workpiece W in the robot coordinate system made known in Step S100. That is, by considering the position of the vision sensor 50 held by the robot 3 at the time of image-capturing, the coordinate processing unit 56 performs processing of converting the position of the workpiece W in the robot coordinate system on the positional information indicating the position of the workpiece W in the image coordinate system or the positional information indicating the position of the workpiece W in the sensor coordinate system. The position of the workpiece W in the image coordinate system or the position of the workpiece W in the sensor coordinate system is stored in the storage unit 54 together with the image at the time of image-capturing. That is, annotation of the position of the workpiece W is given to the image.

In Step S104, it is determined whether or not the processing from Step S101 to Step S103 has been performed a predetermined number of times. In a case in which the processing has not been performed a predetermined number of times, the processing from Step S101 to Step S103 is repeated. That is, the processing of Step S101 to Step S103 is repeated until sets of images and position data of the workpiece W are sufficiently acquired. In a case in which it is determined in Step S104 that the processing has been performed equal to or more than a predetermined number of times, it is determined that the sets of images and position data of the workpiece W have been sufficiently acquired, and the processing advances to Step S105.

In Step S105, the predetermined number of sets of images and position data of the workpiece W is inputted to the learner 70 as a learning data set. The learner 70 constructs a learning model by performing supervised learning based on the input data and labels of the data set. For learning of the learner 70, a method such as YOLO (You Only Look Once) or SSD (Single Shot multibox Detector) can be used. Alternatively, as disclosed in the non-patent document titled "Real-Time Seamless Single Shot 6D Object Pose Prediction", the constitution of a bounding box of the object may be used as a substitute for the label and the output of inference. As described above, a known technique can be used for learning of the learner 70.

For example, the learner 70 performs supervised learning using a neural network. In this case, the learner 70 performs forward propagation which provides a set of input data and a label (training data) to a neural network constituted by a combination of perceptrons, and changes the weighting for each perceptron contained in the neural net so that the output of the neural network is the same as the label. The forward propagation is performed so that the detection result (e.g., position, posture, and size) of the workpiece W outputted by the neural network becomes the same as the detection result (e.g., position, posture, size) of the object of the label.

Then, after performing the forward propagation in this way, the learner 70 adjusts the weighting value so as to reduce the error of the output of each perceptron by a technique called back propagation (also referred to as error back propagation method). More specifically, the learner 70 calculates the error between the output of the neural network and the label, and corrects the weighting value so as to reduce the calculated error. The learner 70 thus learns the features of the training data and recursively obtains a learning model for estimating results from the inputs.

In Step S106, the image processing unit 55 determines whether or not adequate detection accuracy has been obtained from the learning model thus generated. That is, it is determined whether it is possible to accurately detect the image of the workpiece W from the image including the workpiece W that has been newly captured by the vision sensor 50. Whether or not the performance requirement is satisfied may be determined by the user based on a predetermined determination method which is set in advance, or may be determined by a determination algorithm based on an image whose correct answer or the like is known in advance. The performance requirement refers to, for example, various conditions relating to image detection, such as a correctness rate of whether or not the position of an image is correctly detected and an error frequency being equal to or less than a predetermined value. In a case in which it is determined in Step S106 that the performance requirement is satisfied, the processing advances to Step S107. In a case in which it is determined in Step S106 that the performance requirement is not satisfied, the processing returns to Step S101 in order to add learning data. At this time, the processing of updating may be performed such that the numerical value of the predetermined number of times determined in Step S104 is increased.

In Step S107, the processing is performed which updates the previous learning model generated before the data set is inputted in Step S105 to the learning model generated based on the newly inputted data set. That is, when new training data is acquired after the learning model is constructed, the learning model once constructed is updated.

By using the learning model updated based on the latest data set, the learning device 7 can accurately detect an image of the workpiece W from an image including the workpiece W captured by the vision sensor 50.

It should be noted that the machine control device 4, the image-processing device 51, and the learning device 7 are configured by arithmetic processors such as a DSP (Digital Signal Processor) and a FPGA (Field-Programmable Gate Array, for example. The various functions of the machine control device 4, the image processing device 51, and the learning device 7 are realized by executing predetermined software (programs, applications) stored in the storage unit, for example. The various functions of the machine control device 4, the image processing device 51, and the learning device 7 may be realized by cooperation between hardware and software, or may be realized only by hardware (electronic circuits).

Figure 5:
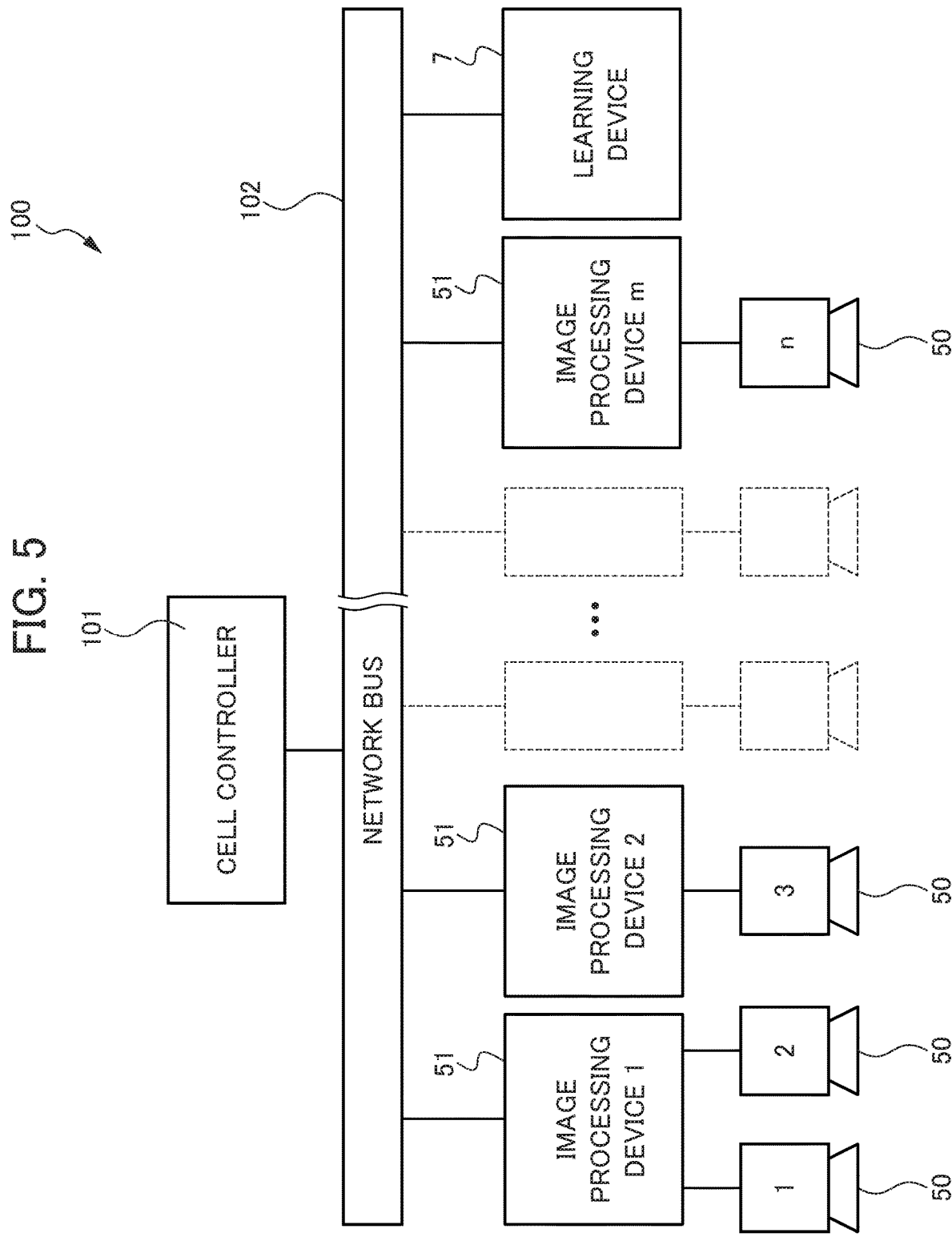
FIG. 5 is a diagram schematically showing an example of an industrial machine including a plurality of image processing devices according to an embodiment of the present disclosure.

The learning model generated by the learner 70 may be shared with other learning devices. If the learning model is shared by a plurality of learning devices, it is possible to perform supervised learning in a distributed manner in each learning device, and therefore, it is possible to improve the efficiency of supervised learning. An example of sharing a learning model will be described with reference to FIG. 5. FIG. 5 is a diagram schematically showing an example of an industrial machine 1 including a plurality of image processing devices 51 according to an embodiment of the present disclosure.

In FIG. 5, m number of image processing devices 51 are connected to a cell controller 1001 via a network bus 102. One or more vision sensors 50 are connected to each of the image processing devices 51. The industrial machine 1 as a whole comprises a total of n number of vision sensors 50.

A learning device 7 is connected to the network bus 102. The learning device 7 constructs a learning model by performing machine learning using a collection of learning data sent from the plurality of image processing devices 51 as a data set. The learning model can be used to detect the workpiece W of each image processing device 51.

As described above, an industrial machine 1 as an annotation device of an aspect of the present disclosure includes: a vision sensor (an image-capturing device) 50 that image-captures one or more workpiece (object) W and acquires an image; a robot 3 that moves the vision sensor 50 or the workpiece W so that the workpiece W enters an image-capturing range of the vision sensor 50; a machine control device (a control unit) 4 that controls movement of the robot 3; an image processing unit (a designation unit) or an input unit (a designation unit) that designates a position of the workpiece W in an image coordinate system of the image captured by the vision sensor 50, a position of the workpiece W in a sensor coordinate system with a position of the vision sensor 50 as a reference, or a position of the workpiece W in a robot coordinate system with the robot as a reference; a coordinate processing unit 56 configured to convert the position of the workpiece W in the image coordinate system or the position of the workpiece W in the sensor coordinate system into the position of the workpiece W in the robot coordinate system, and configured to convert the position of the workpiece W in the robot coordinate system into the position of the workpiece W in the image coordinate system or the position of the workpiece W in the sensor coordinate system; and a storage unit 54 that stores a position of the workpiece W in the robot coordinate system acquired based on a designation of the image processing unit (the designation unit) 55 or the input unit (the designation unit) 53. The machine control device (the control unit) 4 controls the robot 3 so as to acquire a learning image of a plurality of the workpieces W, each having a different positional relationship between the vision sensor and the workpiece W. Furthermore, the storage unit 54 converts the position of the workpiece W in the robot coordinate system into the position of the workpiece W in the image coordinate system at the time of image-capturing or the position of the workpiece W in the sensor coordinate system, and stores position thus converted together with the learning image.

It is thereby possible to grasp the relative relationship between the vision sensor 50 as an image-capturing device and the workpiece W as an object by using the position of the robot 3. By using the position of the known workpiece W in the robot coordinate system, it is possible to automatically acquire the position of the workpiece W in the image coordinate system for a certain image or the position of the workpiece W in the sensor coordinate system. This allows a large amount of supervised data to be efficiently and accurately collected.

Furthermore, the industrial machine 1 according to an aspect of the present disclosure further includes a machining head (a gripping portion) 2 that grips the workpiece W, in which the machine control device 4 makes the positional relationship between the vision sensor 50 and the workpiece W different by changing a position, a posture, or both of the workpiece W while gripping the workpiece W by the machining head 2, and acquires the learning image.

This makes it possible to automatically, easily, and accurately acquire learning data having a wide positional relationship of the workpiece W with respect to the workpiece W as the object.

Furthermore, in the industrial machine 1 according to an aspect of the present disclosure, a learning model is generated based on learning data including the learning image stored in the storage unit 54, and information indicating a position of the workpiece W associated with the learning image, and in a case in which it is determined that image detection processing using the learning model does not satisfy a performance requirement, the annotation device newly acquires the learning image and the information indicating the position of the workpiece W.

As a result, since learning data is added when the detection accuracy of the workpiece W as the object is not improved, it is possible to reliably prevent the occurrence of a situation in which the detection accuracy is not sufficiently improved due to the shortage of learning data.

While embodiments of the present disclosure have been described above, the present invention is not limited to the above-described embodiments. Furthermore, the effects according to the present invention are not limited to those described in the present embodiment.

In addition to the configuration of the above embodiment, processing of changing the brightness of illumination or the like may be added in the processing of Step S101. By learning the difference in the brightness of the illumination, it is possible to further increase the detection accuracy of the workpiece W as an object.

Although the above embodiment is a configuration in which the vision sensor 50 is held by the robot 3, it may be configured such that the vision sensor 50 side is fixed, and the workpiece W may be configured to move within the field of view of the vision sensor 50 by the robot 3.

In the above embodiment, a configuration is described in which the machine control device 4 and the image processing device 51 are separate as an example. However, a single control device having the functions of both the machine control device 4 and the image processing device 51 may be used as an annotation device. In this manner, the annotation device can refer to an information processing device (computer) in general. For example, a server, a PC, various control devices, and the like may be used as an annotation device.

In the above embodiment, the industrial machine 1 is configured to include the learning device 7. However, the learning device 7 may be omitted, and a configuration may be established which only performs annotation to provide data sets to other learning devices.

The industrial machine 1 may be a machine tool for positioning a workpiece or a tool by a positioning mechanism and machining the workpiece.

The annotation processing by the industrial machine 1 is realized by software. If realized by software, programs constituting this software are installed in the image processing device 51. Furthermore, these programs may also be recorded on removable media and distributed to the user or downloaded to the user's computer over a network.

EXPLANATION OF REFERENCE NUMERALS 1 industrial device (annotation device)
3 robot
4 machine control device (control unit)
50 vision sensor (image-capturing device)
53 input unit (designation unit)
54 storage unit
55 image processing unit (designation unit)
56 coordinate processing unit
w workpiece (object)

What is claimed is:

1. An annotation device comprising:
an image-capturing device that image-captures one or more object and acquires an image;
a robot that moves the image-capturing device or the object so that the object enters an image-capturing range of the image-capturing device;
a control unit that controls movement of the robot;
a designation unit that designates a position of the object in an image coordinate system of the image captured by the image-capturing device, a position of the object in a sensor coordinate system with a position of the image-capturing device as a reference, or a position of the object in a robot coordinate system with the robot as a reference;
a coordinate processing unit configured to convert the position of the object in the image coordinate system or the position of the object in the sensor coordinate system into the position of the object in the robot coordinate system, and configured to convert the position of the object in the robot coordinate system into the position of the object in the image coordinate system or the position of the object in the sensor coordinate system;
a storage unit that stores a position of the object in the robot coordinate system acquired based on a designation of the designation unit; and
a learning device that performs learning to generate a learning model based on input data and labels corresponding to the input data,
wherein the control unit controls the robot so as to acquire a learning image of a plurality of the objects, each having a different positional relationship between the image-capturing device and the object, and
wherein the storage unit converts the position of the object in the robot coordinate system into the position of the object in the image coordinate system at the time of image-capturing or the position of the object in the sensor coordinate system, and stores the position thus converted as one of the labels together with the learning image as the input data corresponding to the one of the labels.

2. The annotation device according to claim 1, further comprising a gripping portion that grips the object,
wherein the control device makes the positional relationship between the image-capturing device and the object different by changing a position, a posture, or both of the object while gripping the object by the gripping portion, and acquires the learning image.

3. The annotation device according to claim 1, wherein the learning model is generated based on learning data including the learning image stored in the storage unit, and information indicating a position of the object associated with the learning image, and
in a case in which it is determined that image detection processing using the learning model does not satisfy a performance requirement, the annotation device newly acquires the learning image and the information indicating the position of the object.

* * * * *